(12) United States Patent
Delp

(10) Patent No.: US 10,118,614 B2
(45) Date of Patent: Nov. 6, 2018

(54) DETAILED MAP FORMAT FOR AUTONOMOUS DRIVING

(71) Applicant: Toyota Motor Engineering & Manufacturing North America, Inc., Erlanger, KY (US)

(72) Inventor: Michael J. Delp, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/155,313

(22) Filed: May 16, 2016

(65) Prior Publication Data

US 2016/0257307 A1   Sep. 8, 2016

Related U.S. Application Data

(63) Continuation of application No. 14/265,370, filed on Apr. 30, 2014, now abandoned.

(51) Int. Cl.
*G01C 21/00* (2006.01)
*B60W 30/12* (2006.01)
(Continued)

(52) U.S. Cl.
CPC .............. *B60W 30/12* (2013.01); *G01C 21/20* (2013.01); *G01C 21/32* (2013.01); *G01C 21/34* (2013.01);
(Continued)

(58) Field of Classification Search
CPC .... G08G 1/167; G05D 1/0274; G05D 1/0088; B60W 30/12; G01C 21/20; G01C 21/32; G01C 21/34; G01C 21/23658
See application file for complete search history.

(56) References Cited

U.S. PATENT DOCUMENTS 3,613,073 A   10/1971  Clift
3,771,096 A * 11/1973  Walter .................... B60Q 1/40
                                                    439/15

(Continued)

FOREIGN PATENT DOCUMENTS

EP    1498694 A2    1/2005
EP    1909247 A1    4/2008
(Continued)

OTHER PUBLICATIONS

Extended European Search Report, European Patent Application No. EP15166003.2, dated Jul. 16, 2015 (7 pages).
(Continued)

*Primary Examiner* — Khoi H Tran
*Assistant Examiner* — Jorge O Peche
(74) *Attorney, Agent, or Firm* — Christopher G. Darrow; Darrow Mustafa PC

(57) ABSTRACT

A computer-readable detailed map format is disclosed. The detailed map format includes a lane segment and one or more border segments. The map format can be used in the operation of an autonomous vehicle. A current location of the autonomous vehicle can be determined. The current location of the autonomous vehicle can be compared to the computer readable map format. A distance between the current location of the autonomous vehicle and an edge of the lane segment at a location along the lane segment can be determined by, for example, measuring a distance between the current location of the autonomous vehicle and a portion of the border segment closest to the current location of the autonomous vehicle. A driving maneuver can be determined based at least in part on the determined distance. One or more vehicle systems of the autonomous vehicle can be caused to implement the determined driving maneuver.

18 Claims, 3 Drawing Sheets

(51) Int. Cl.
  *G01C 21/36*  (2006.01)
  *G01C 21/32*  (2006.01)
  *G01C 21/20*  (2006.01)
  *G01C 21/34*  (2006.01)
  *G05D 1/00*  (2006.01)

(52) U.S. Cl.
  CPC ...... *G01C 21/3658* (2013.01); *G05D 1/0088* (2013.01)

(56) References Cited

U.S. PATENT DOCUMENTS

| | | | |
|---|---|---|---|
| 4,704,610 A | 11/1987 | Smith et al. | |
| 4,775,865 A | 10/1988 | Smith et al. | |
| 4,884,072 A | 11/1989 | Horsch | |
| 5,041,828 A | 8/1991 | Loeven | |
| 5,278,554 A | 1/1994 | Marton | |
| 5,712,618 A * | 1/1998 | McKenna | B60Q 1/346 340/463 |
| 5,798,949 A | 8/1998 | Kaub | |
| 5,801,646 A | 9/1998 | Pena | |
| 5,873,674 A | 2/1999 | Hohl | |
| 5,926,126 A * | 7/1999 | Engelman | B60K 31/0008 340/435 |
| 6,148,370 A | 11/2000 | Kobayashi | |
| 6,226,389 B1 * | 5/2001 | Lemelson | G01S 13/931 382/104 |
| 6,230,098 B1 | 5/2001 | Ando et al. | |
| 6,232,889 B1 | 5/2001 | Apitz et al. | |
| 6,253,128 B1 * | 6/2001 | Kageyama | G05D 1/027 180/168 |
| 6,317,058 B1 | 11/2001 | Lemelson et al. | |
| 6,321,159 B1 * | 11/2001 | Nohtomi | B62D 1/28 340/903 |
| 6,338,021 B1 | 1/2002 | Yagyu et al. | |
| 6,405,132 B1 * | 6/2002 | Breed | B60N 2/002 701/117 |
| 6,418,371 B1 | 7/2002 | Arnold | |
| 6,526,352 B1 * | 2/2003 | Breed | G01C 21/3697 342/357.31 |
| 6,919,823 B1 | 7/2005 | Lock | |
| 7,433,889 B1 | 10/2008 | Barton | |
| 7,477,988 B2 | 1/2009 | Dorum | |
| 8,000,897 B2 * | 8/2011 | Breed | B60N 2/2863 701/301 |
| 8,121,749 B1 | 2/2012 | Agrawal et al. | |
| 8,209,120 B2 * | 6/2012 | Breed | G08G 1/161 340/539.2 |
| 8,489,316 B1 * | 7/2013 | Hedges | G01C 21/30 701/300 |
| 8,527,199 B1 | 9/2013 | Burnette et al. | |
| 8,712,624 B1 | 4/2014 | Ferguson et al. | |
| 8,761,991 B1 | 6/2014 | Ferguson et al. | |
| 8,855,904 B1 | 10/2014 | Templeton et al. | |
| 8,917,190 B1 | 12/2014 | Melvin | |
| 9,830,517 B2 * | 11/2017 | Vladimerou | G06K 9/00798 |
| 2001/0025528 A1 | 10/2001 | Blew et al. | |
| 2002/0067292 A1 * | 6/2002 | Appenrodt | G01C 21/30 340/988 |
| 2002/0198632 A1 * | 12/2002 | Breed | B60N 2/2863 701/1 |
| 2003/0016143 A1 | 1/2003 | Ghazarian | |
| 2005/0060069 A1 * | 3/2005 | Breed | B60N 2/2863 701/408 |
| 2005/0134440 A1 * | 6/2005 | Breed | B60N 2/2863 340/435 |
| 2005/0137786 A1 * | 6/2005 | Breed | B60N 2/2863 701/482 |
| 2005/0200467 A1 * | 9/2005 | Au | B60Q 1/34 340/465 |
| 2005/0273261 A1 * | 12/2005 | Niwa | B60W 50/14 701/301 |
| 2006/0184321 A1 | 8/2006 | Kawakami et al. | |
| 2006/0224303 A1 | 10/2006 | Hayashi | |
| 2007/0005609 A1 * | 1/2007 | Breed | B60N 2/2863 |
| 2007/0021912 A1 | 1/2007 | Morita et al. | |
| 2007/0021915 A1 * | 1/2007 | Breed | B60N 2/2863 701/301 |
| 2007/0091173 A1 * | 4/2007 | Kade | B60W 50/14 348/119 |
| 2007/0109111 A1 * | 5/2007 | Breed | B60N 2/2863 340/435 |
| 2007/0152804 A1 * | 7/2007 | Breed | B60N 2/2863 340/435 |
| 2007/0200730 A1 | 8/2007 | Kang | |
| 2007/0296610 A1 | 12/2007 | Heffernan | |
| 2008/0012726 A1 | 1/2008 | Publicover | |
| 2008/0015771 A1 * | 1/2008 | Breed | B60N 2/2863 701/300 |
| 2008/0040023 A1 * | 2/2008 | Breed | B60N 2/2863 701/117 |
| 2008/0040029 A1 * | 2/2008 | Breed | B60N 2/2863 701/514 |
| 2008/0042815 A1 * | 2/2008 | Breed | B60N 2/2863 340/435 |
| 2008/0097689 A1 | 4/2008 | Germanos et al. | |
| 2008/0106436 A1 * | 5/2008 | Breed | B60N 2/2863 340/905 |
| 2008/0133136 A1 * | 6/2008 | Breed | B60N 2/2863 701/301 |
| 2008/0140318 A1 * | 6/2008 | Breed | B60N 2/2863 702/3 |
| 2008/0147253 A1 * | 6/2008 | Breed | B60W 30/16 701/3 |
| 2008/0150786 A1 * | 6/2008 | Breed | B60N 2/2863 342/53 |
| 2008/0154629 A1 * | 6/2008 | Breed | B60N 2/2863 705/1.1 |
| 2008/0162027 A1 | 7/2008 | Murphy et al. | |
| 2008/0172171 A1 | 7/2008 | Kowalski | |
| 2008/0238720 A1 | 10/2008 | Lee | |
| 2008/0284616 A1 | 11/2008 | Rendon | |
| 2008/0291052 A1 | 11/2008 | Burns | |
| 2009/0030605 A1 * | 1/2009 | Breed | B60N 2/2863 701/532 |
| 2009/0043506 A1 * | 2/2009 | Breed | G08G 1/161 701/472 |
| 2009/0135024 A1 | 5/2009 | Park et al. | |
| 2009/0312888 A1 | 12/2009 | Sickert et al. | |
| 2009/0326751 A1 | 12/2009 | Otake et al. | |
| 2010/0002911 A1 * | 1/2010 | Wu | B60W 30/12 382/104 |
| 2010/0017060 A1 * | 1/2010 | Zhang | G01S 7/4802 701/41 |
| 2010/0020170 A1 * | 1/2010 | Higgins-Luthman | B60Q 1/1423 348/135 |
| 2010/0026804 A1 | 2/2010 | Tanizaki et al. | |
| 2010/0073194 A1 | 3/2010 | Ghazarian | |
| 2010/0262359 A1 | 10/2010 | Motoyama | |
| 2010/0312527 A1 * | 12/2010 | Weiland | G01C 21/32 703/1 |
| 2011/0006915 A1 | 1/2011 | Sower | |
| 2011/0015850 A1 * | 1/2011 | Tange | B60W 30/12 701/116 |
| 2011/0025528 A1 | 2/2011 | Rejali et al. | |
| 2011/0080303 A1 | 4/2011 | Goldberg et al. | |
| 2011/0118900 A1 | 5/2011 | Uchida et al. | |
| 2011/0182473 A1 | 7/2011 | Wang | |
| 2011/0187559 A1 | 8/2011 | Applebaum | |
| 2012/0095646 A1 | 4/2012 | Ghazarian | |
| 2012/0098678 A1 * | 4/2012 | Rathmacher | G01C 21/3697 340/937 |
| 2012/0101712 A1 * | 4/2012 | Schramm | B62D 15/025 701/300 |
| 2012/0112927 A1 | 5/2012 | Grieco et al. | |
| 2012/0123640 A1 | 5/2012 | Mukaiyama | |
| 2012/0209505 A1 * | 8/2012 | Breed | G01C 21/3697 701/409 |
| 2012/0323474 A1 * | 12/2012 | Breed | B60W 30/04 701/117 |

(56) References Cited

U.S. PATENT DOCUMENTS

| | | | |
|---|---|---|---|
| 2013/0018572 A1 | 1/2013 | Jang | |
| 2013/0038433 A1 | 2/2013 | Ullrich | |
| 2013/0080019 A1* | 3/2013 | Isaji | B60W 30/16 701/96 |
| 2013/0245945 A1 | 9/2013 | Morita et al. | |
| 2013/0304322 A1* | 11/2013 | Isaji | B62D 15/025 701/41 |
| 2013/0335238 A1 | 12/2013 | Matsur | |
| 2014/0104051 A1* | 4/2014 | Breed | G06K 9/00791 340/435 |
| 2014/0200798 A1 | 7/2014 | Huelsen | |
| 2014/0257659 A1* | 9/2014 | Dariush | G08G 1/166 701/70 |
| 2015/0105989 A1 | 4/2015 | Lueke et al. | |
| 2015/0124096 A1 | 5/2015 | Koravadi | |
| 2015/0151725 A1* | 6/2015 | Clarke | B60W 30/00 701/28 |
| 2015/0177007 A1* | 6/2015 | Su | G01C 21/34 701/25 |
| 2015/0266508 A1* | 9/2015 | Yoshihata | B62D 15/025 701/41 |
| 2015/0339533 A1* | 11/2015 | Liu | G06K 9/00805 382/104 |
| 2015/0367778 A1* | 12/2015 | Vladimerou | G06K 9/00798 348/148 |
| 2016/0221575 A1* | 8/2016 | Posch | B60W 50/0098 |
| 2016/0318490 A1 | 11/2016 | Ben Shalom | |
| 2017/0036678 A1* | 2/2017 | Takamatsu | B60W 10/04 |
| 2017/0110010 A1 | 4/2017 | Grabs et al. | |
| 2018/0046196 A1* | 2/2018 | Hashimoto | B60W 10/18 |
| 2018/0101172 A1* | 4/2018 | Min | G05D 1/0088 |

FOREIGN PATENT DOCUMENTS

| | | |
|---|---|---|
| EP | 2466566 A1 | 6/2012 |
| JP | 2002333829 A | 11/2002 |
| JP | 2003315056 A | 11/2003 |
| JP | 2007086156 A | 4/2007 |
| JP | 2007278813 A | 10/2007 |
| JP | 2009015504 A | 1/2009 |
| JP | 2009199572 A | 9/2009 |
| JP | 2010026875 A | 2/2010 |
| WO | 2012163573 A1 | 12/2012 |
| WO | 2013060925 A1 | 5/2013 |

OTHER PUBLICATIONS

Geographic Data Filed—GDF, Presentations, Articles, Publications/Documents/Handouts, retrieved from the Internet: < https://web.archive.org/web/*/http://www.ertico.com/assets/download/GDF/handouts.pdf>, website <http://www.ertico.com/assets/download/GDF/handouts.pdf> last archived Apr. 1, 2014 (41 pages).
OpenStreetMap Wiki, retrieved from the Internet: <http://wiki.openstreetmap.org/wiki/Main_Page>, retrieved Feb. 19, 2016 (3 pages).
Czerwionka et al., "Optimized Route Network Graph as Map Reference for Autonomous Cars Operating on German Autobahn", Artificial Intelligence Group Institute of Computer Science freie Universitat Berlin, Germany (6 pages).
CEN Technical Committee 278 Road Transport and Traffic Telematics. (1995). Geographic Data Files. Nederlands Normalisatie Instituut. p. 42 available at: http://www.ertico.com/assets/download/GDF/TOC1-5.pdf (1 page).
Kiwi-W Consortium. (2001). Outline of Kiwi Format. Slide 20, information available at http://www.kiwi-w.org/documents_eng.html (1 page).
International Search Report and Written Opinion for International Application No. PCT/US2015/027347, dated Jul. 3, 2015 (12 pages).

\* cited by examiner

DETAILED MAP FORMAT FOR AUTONOMOUS DRIVING

CROSS-REFERENCE TO RELATED APPLICATIONS

This application is a continuation of U.S. application Ser. No. 14/265,370, filed Apr. 30, 2014, which is hereby incorporated by reference in its entirety.

BACKGROUND

Fully or highly automated, e.g. autonomous or self-driven, driving systems are designed to operate a vehicle on the road either without or with low levels of driver interaction or other external controls. Autonomous driving systems require certainty in the position of and distance to geographic features surrounding the vehicle with a sufficient degree of accuracy to adequately control the vehicle. Details about the road or other geographic features surrounding the vehicle can be recorded on a detailed virtual map. The more accurate the detailed virtual map, the better the performance of the autonomous driving system. Existing virtual maps do not include sufficient or sufficiently accurate geographic feature details for optimized autonomous operation.

SUMMARY

The detailed map format described here can be used to represent the drivable area of a road, including the boundary locations of each lane, the exact width of each lane, and the location of the impassable borders of a given lane, such as curbs, medians, and islands. The detailed map format can also include information to support driving rules associated with a given lane of the road, to calculate the distance from any object within the map format to the boundary of a lane, and to identify other map features intersecting a lane, such as crosswalks and driveways. The highly detailed nature of this map format allows for improved control of a highly-automated or autonomous vehicle as well as for improved localization (exact positioning) of the autonomous vehicle in respect to the detailed map format.

Each lane within the detailed map format can include lane segments formed of waypoints. The detailed map format disclosed can also include border segments formed of borderpoints. Information associated with these border segments and borderpoints includes border type and border color. An autonomous vehicle can be controlled to operate according to driving rules based on a given border type and border color associated with the detailed map format. Border segments can also be used to determine the distance to an edge of a lane for a given lane segment or the width of the lane at any point along the lane segment, providing for more accurate control of the autonomous vehicle than is possible using lane segments formed of waypoints alone.

In one respect, the subject matter described herein is directed to a method of operating an autonomous vehicle using a computer-readable map format. The method can include determining a current location of the autonomous vehicle. The method can also include comparing the current location of the autonomous vehicle to a computer readable map format. The map format can include a lane segment and a border segment. The method can further include determining a distance between the current location of the autonomous vehicle and an edge of the lane segment at a location along the lane segment. The determining of the distance can include measuring a distance between the current location of the autonomous vehicle and a portion of the border segment closest to the current location of the autonomous vehicle. The method can include determining a driving maneuver based on the determined distance. The method can include causing one or more vehicle systems of the autonomous vehicle to implement the determined driving maneuver.

In another respect, the subject matter described herein is directed to an autonomous vehicle system. The system can include a processing unit. The system can also include a memory communicatively coupled to the processing unit. The memory can include a computer-readable map format. The map format can include a lane segment and a border segment. The system can include one or more vehicle communicatively coupled to the processing unit. The processing unit can be configured to compare a current location of an autonomous vehicle to the map format. The processing unit can be configured to determine a distance between the current location of the autonomous vehicle and an edge of the lane segment at a location along the lane segment. Such determining can include measuring a distance between the current location of the autonomous vehicle and a portion of the border segment closest to the current location of the autonomous vehicle. The processing unit can be configured to determine a driving maneuver based on the determined distance. The processing unit can be configured to cause one or more of the vehicle systems to implement the determined driving maneuver.

BRIEF DESCRIPTION OF THE DRAWINGS

The description herein makes reference to the accompanying drawings wherein like reference numerals refer to like parts throughout the several views, and wherein.

DETAILED DESCRIPTION

A computer-readable, highly detailed map format for an autonomous vehicle is disclosed. The detailed map format includes information representing the geographical location, travel direction, and speed limit of lanes on a given road using lane segments formed of waypoints. Beyond this basic information, the detailed map format also includes the geographical location for the borders of each lane in the form of border segments formed of borderpoints. Information associated with the border segments and border points within the detailed map format can include the border type and border color, such that driving rules can be associated with the lane segments based on the closest border segments. The detailed map format can also include stop lines linked to the end of lanes at traffic intersections to better position the autonomous vehicle for entry into a traffic intersection and to indicate where the autonomous vehicle should stop at the traffic intersection. Crosswalks can also be included in the detailed map format and associated with safety rules to be followed when the autonomous vehicle approaches the crosswalk.

Figure 1:
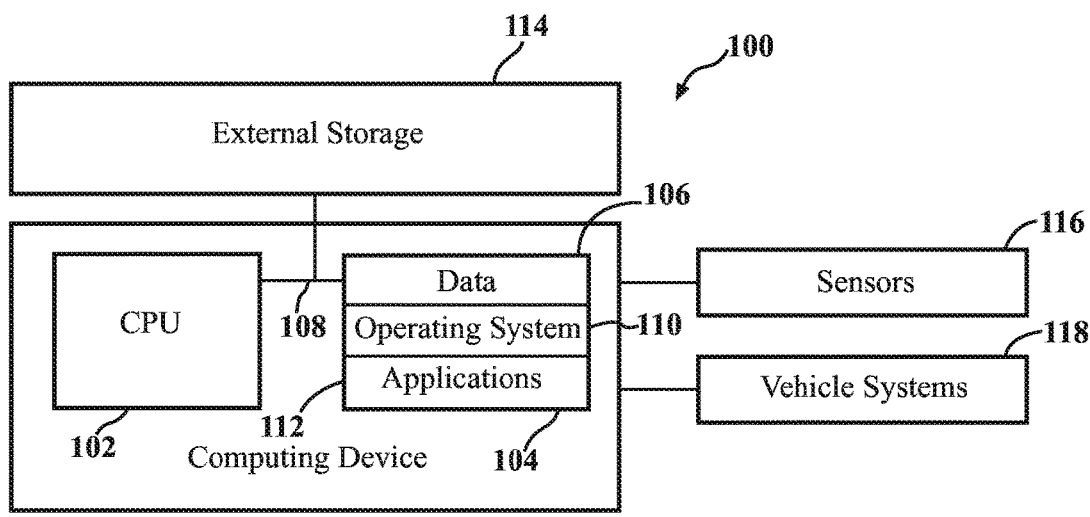
FIG. 1 is a block diagram of a computing device.

FIG. 1 is a block diagram of a computing device 100, for example, for use with autonomous driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform automated driving methods using the detailed map format described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with one or more sensors 116. The sensors 116 can capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle for use in creating a detailed map format as described below, including information specific to objects such as features of the route being travelled by the vehicle or other localized position data and/or signals and outputting corresponding data and/or signals to the CPU 102.

In the examples described below, the sensors 116 can capture, at least, signals for a GNSS or other system that determines vehicle position and velocity and data for a LIDAR system or other system that measures vehicle distance from lane lines (e.g., route surface markings or route boundaries), obstacles, objects, or other environmental features including traffic lights and road signs. The computing device 100 can also be in communication with one or more vehicle systems 118, such as vehicle braking systems, vehicle propulsions systems, etc. The vehicle systems 118 can also be in communication with the sensors 116, the sensors 116 being configured to capture data indicative of performance of the vehicle systems 118.

Figure 2:
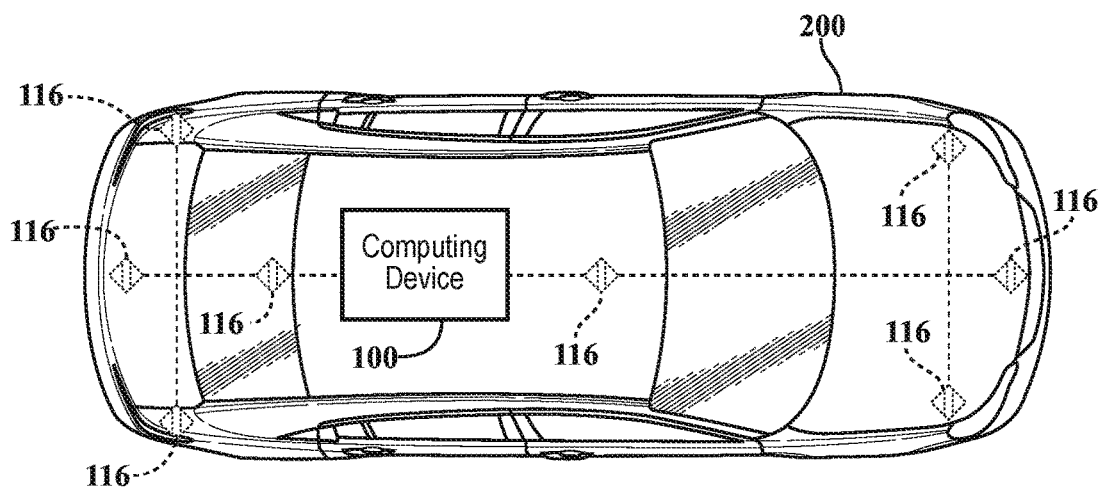
FIG. 2 is a schematic illustration of an autonomous vehicle including the computing device of FIG. 1.

FIG. 2 is a schematic illustration of an autonomous vehicle 200 including the computing device 100 of FIG. 1. The computing device 100 can be located within the vehicle 200 as shown in FIG. 2 or can be located remotely from the vehicle 200 in an alternate location (not shown). If the computing device 100 is located remotely from the vehicle 200, the vehicle 200 can include the capability of communicating with the computing device 100.

The vehicle 200 can also include a plurality of sensors, such as the sensors 116 described in reference to FIG. 1. One or more of the sensors 116 shown can be configured to capture the distance to objects within the surrounding environment for use by the computing device 100 to estimate position and orientation of the vehicle 200, images for processing by an image sensor, vehicle position in global coordinates based on signals from a plurality of satellites, or any other data and/or signals that could be used to determine the current state of the vehicle or determine the position of the vehicle 200 in respect to its environment for use in either creating a detailed map format or comparing the vehicle's 200 position to the detailed map format. Recognized geographic features such as those described below can be used to build a detailed map format, and objects such as other vehicles can be recognized and excluded from the detailed map format.

Map formats can be constructed using geographic features captured by the vehicle 200 such as lane lines and curbs proximate the vehicle 200 as it travels a route. These geographic features can be captured using the above described LIDAR system and/or cameras in combination with an algorithm such as random sample consensus (RANSAC) to find lines, record the position of the vehicle 200, and collect data on position from a GNSS and/or an IMU. The captured geographic features can then be manipulated using a simultaneous localization and mapping (SLAM) technique to position all of the geographic features in relation to the vehicle's 200 position. Some of the geographic features can be categorized as lane borders, and lane centers can be determined based on the lane borders. Alternatively, map formats can be constructed using overhead images (e.g. satellite images) of geographic features traced by a map editor that allows selection of different categories for each geographic feature.

Figure 3:
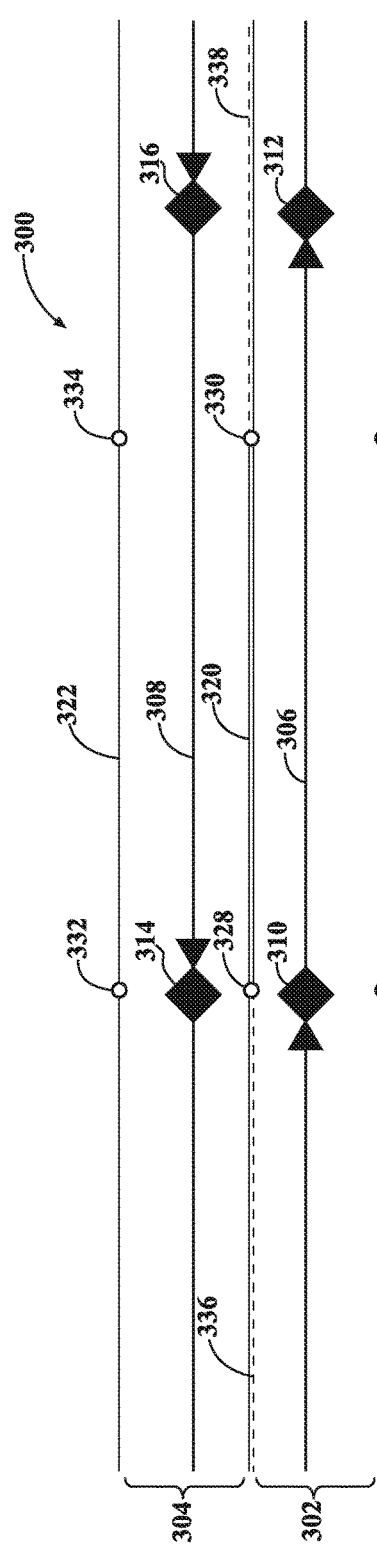
FIG. 3 shows an example two-dimensional representation of a portion of a two-lane road as represented within a detailed map format for use with the autonomous vehicle of FIG. 2.

FIG. 3 shows an example two-dimensional representation of a portion of a two-lane road 300 as represented within a detailed map format for use with the autonomous vehicle 200 of FIG. 2. The two-lane road 300 in this example map format includes lanes 302, 304. Each of the lanes 302, 304 can include a lane segment 306, 308. Each of the lane segments 306, 308 can extend between at least two waypoints 310, 312, 314, 316, for example, the lane segment 306 extends between the waypoints 310, 312 and the lane segment 308 extends between the waypoints 314, 316. Information can be associated with the waypoints 310, 312, 314, 316 and stored as part of the map format. For example, each waypoint 310, 312, 314, 316 can include information such as geographical location, lane speed, and lane direction.

In the example map format shown in FIG. 3, the lane 302 is shown as having a left-to-right direction by arrows touching the waypoints 310, 312 and the lane 304 is shown as having a right-to-left direction by arrows touching the waypoints 314, 316. The overall computer-readable map format can be stored in plain text, binary, or xml, for example. The basic map information can be gathered from a route network definition file (RNDF) or any other available source. However, this basic map information is not sufficient for control of the autonomous vehicle 200.

Additional detail can be added to the map format in order to improve the map format for use with the autonomous vehicle 200. As shown in FIG. 3, each of the lanes 302, 304 can be further associated with borders. Each of the borders can be formed of one or more border segments 318, 320, 322. Each of the border segments 318, 320, 322 can extend between at least two borderpoints 324, 326, 328, 330, 332, 334. For example, the border segment 318 extends between the borderpoints 324, 326 and the border segment 322 extends between the borderpoints 332, 334. Information can be associated with the borderpoints 324, 326, 328, 330, 332, 334 and stored as part of the map format. For example, each borderpoint 324, 326, 328, 330, 332, 334 can include information such as geographical location, border type, and border color.

The information associated with each borderpoint 324, 326, 328, 330, 332, 334 can be used by the autonomous vehicle 200 in order to determine navigation routes, make decisions regarding passing other vehicles, position or localize the autonomous vehicle 200 in respect to the border segments 318, 320, 322, and determine the driveable area along a given navigation route in order to support safety maneuvers or obstacle tracking. The information associated with each borderpoint 324, 326, 328, 330, 332, 334, can, for example, be built from data collected using a LIDAR sensor and manipulated using a SLAM technique when building the detailed map as describe above. The map information associated with the borders and lanes 302, 304 can be stored, for example, in the form of spline points or as curves with knot vectors in the memory 104 of the computing device 100 or can be available from a remote location.

Examples of different border types that can be associated with the borderpoints 324, 326, 328, 330, 332, 334 can include a "curb," a "single solid line," a "double solid line," a "single dashed line," a "combined dashed line and solid line," and "no line." For example, the borderpoints 324, 326 and hence the border segment 318 extending between them can be associated with a "single solid line" border type. To represent the "single solid line" border type within the map format, borderpoints 324, 326 are shown with an open circle representation and the border segment 318 is shown using a thin, solid line representation. Similarly, the border segment 320 extending between the borderpoints 328, 330 can be associated with a "double solid line" border type. The partially-shown border segments 336, 338 can be associated with a "combined dashed line and solid line" border type. In addition to border type, border color can also be associated with the borderpoints 324, 326, 328, 330, 332, 334. For example, border colors can include "yellow," "white," or "unknown."

Border types and border colors can be used to associate a driving rule with each of the various lane segments 306, 308 (and/or with the waypoints 310, 312, 314, 316 forming the lane segments 306, 308). A driving rule can be based at least in part on the border type and the border color associated with the borderpoints 324, 326, 328, 330, 332, 334 and border segments 318, 318, 322, closest to the lane segment 306, 308. For example, two driving rules can be associated with lane segment 306: first, a driving rule of "no passing border" based on the border segment 320 extending between the borderpoints 328, 330 given that the border segment 320 can be associated with a border type of "double solid line" and a border color of "yellow;" second, a driving rule of "drivable lane border" based on the border segment 318 extending between the borderpoints 324, 326 given that the border segment 318 can be associated with a border type of "single solid line" and a border color of "white." Though the border types, border colors, and driving rules described in reference to FIG. 3 reflect commonly understood traffic rules in the United States, other traffic rules, border types, border colors, and driving rules are also possible.

Another benefit of storing information for both lane segments 306, 308 and border segments 318, 320, 322 in the map format is that the distance to an edge of the lane segment 306, 308 can be determined at any location along the lane segment 306, 308 by measuring a distance between the location and a portion of the border segment 318, 320, 322 closest to the location. This allows for the autonomous vehicle 200 to be positioned within, for example, either of the lanes 302, 304 at an optimum spacing based on the actual geographical location, border color, and border type of the border segment 318, 320, 322 instead of relying on fixed lane widths associated only with waypoints 310, 312, 314, 316. Knowing the actual distance to an edge of the lane segment 306, 308 leads to greater maneuverability of the autonomous vehicle 200. Further, the ability to localize the autonomous vehicle 200 is improved because the border segments 318, 320, 322 as stored within the detailed map format can be matched to images of lane borders or other geographic features captured during autonomous operation of vehicle 200.

In some examples, border segments 318, 320, 322 can be positioned both proximate to and on opposite sides of a given lane segment 306, 308. In these cases, a lane width of the lane segment 306, 308 can be determined at a chosen location along the lane segment 306, 308 by measuring the distance between the two border segments 318, 320, 322 positioned proximate to and on opposite sides of the lane segment 306, 308. For example, the lane width for lane 302 can be calculated anywhere along lane segment 306 by measuring the distance between border segments 318, 320 within the map format. Again, knowing the actual lane width at any point along the lane 302, 304 is beneficial both for overall positioning and maneuvering of the autonomous vehicle 200. The positioning benefit is further described in reference to FIG. 4.

Figure 4:
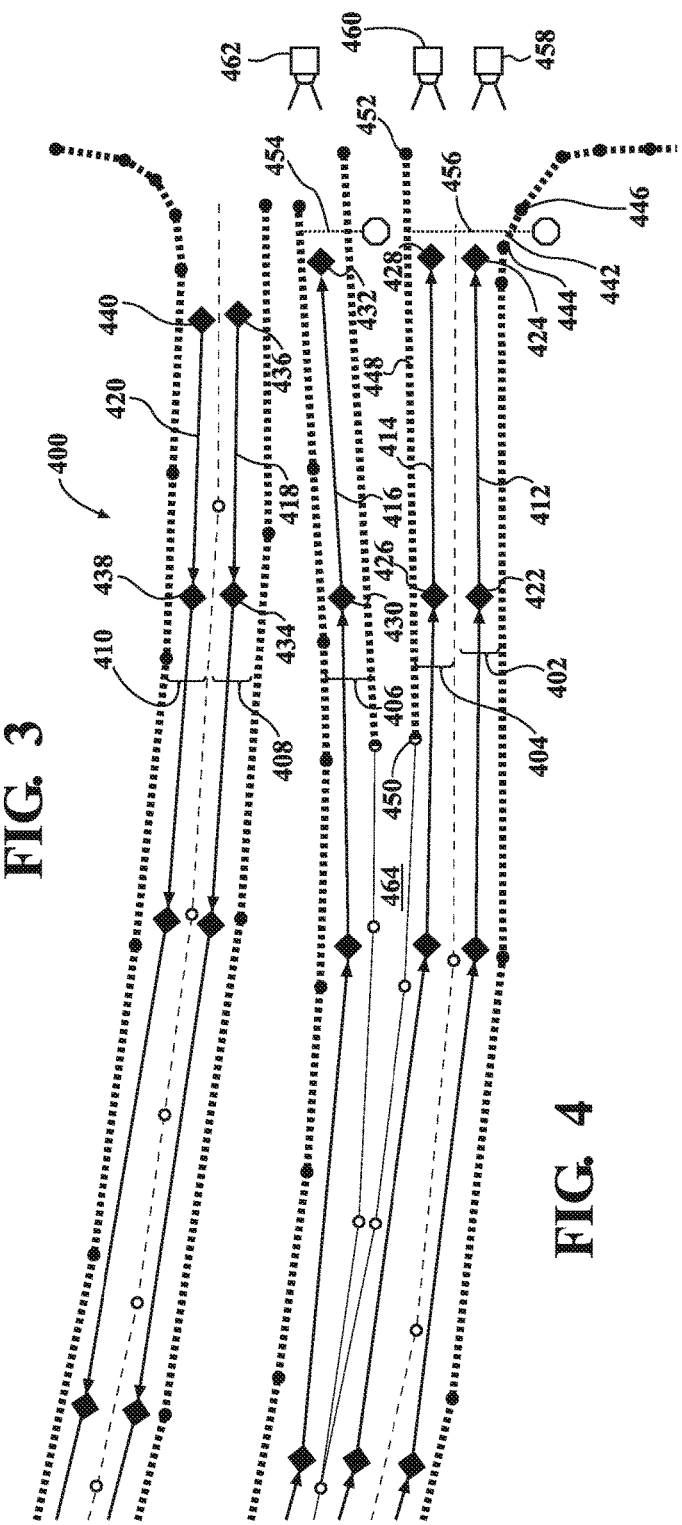
FIG. 4 shows an example two-dimensional representation of a portion of a four-lane road transitioning to a five-lane road at an intersection as represented within a detailed map format for use with the autonomous vehicle of FIG. 2.

FIG. 4 shows an example two-dimensional representation of a portion of a four-lane road transitioning to a five-lane road 400 at an intersection as represented within a detailed map format for use with the autonomous vehicle 200 of FIG. 2. The five-lane road 400 in this example map format includes lanes 402, 404, 406, 408, 410. Each of the lanes 402, 404, 406, 408, 410 can include a lane segment 412, 414, 416, 418, 420. Each of the lane segments 412, 414, 416, 418, 420 can extend between at least two waypoints 422, 424, 426, 428, 430, 432, 434, 436, 438, 440, for example, the lane segment 416 extends between the waypoints 430, 432 and the lane segment 420 extends between the waypoints 438, 440. The lanes 402, 404, 406 proceed in a left-to-right direction as indicated by the arrows associated with the waypoints 422, 424, 426, 428, 430, 432 and the lanes 408, 410 proceed in a right-to-left direction as indicated by the arrows associated with the waypoints 434, 436, 438, 440.

Similar information as described above in reference to FIG. 3 is associated with the waypoints 422, 424, 426, 428, 430, 432, 434, 436, 438, 440 shown in FIG. 4. Each of the lanes 402, 404, 406, 408, 410 can be further associated with borders formed of one or more border segments extending between at least two borderpoints. For simplicity, only a few of the border segments and borderpoints are numbered on the example map format of the road 400 of FIG. 4. For example, border segment 442 extends between borderpoints 444, 446 and border segment 448 extends between borderpoints 450, 452. These border segments 442, 448 are associated with lane segments 412, 414, respectively. As described in respect to FIG. 3, the border segments 442, 448 and borderpoints 444, 446, 450, 452 can be associated with various border types and border colors for use in establishing driving rules.

For example, the border segments 442, 448 can be associated with the "curb" border type, which is represented within the detailed map format using a dotted, hashed line type. The borderpoints 444, 446, 452 are represented using filled circles, and together, the borderpoints 444, 446, 452 and border segments 442, 448 indicate an "impassable" driving rule. When the driving rule indicated is "impassable," the autonomous vehicle 200 is controlled in a manner such that the vehicle 200 will not attempt to navigate beyond the border. The borderpoint 450 is represented using a half-filled circle, indicating a transition in the border type from a "solid line" type to a "curb" type at the location of the borderpoint 450.

Understanding the location of a transition between border types is important for autonomous control, as the vehicle 200 is physically able, if necessary, to navigate along or across a "line" type border, but is not able to safely navigate along or across a "curb" type border. The benefit of using border segments is clear in this example. A median 464 is shown as present between lane 404 and lane 406. The left-most part of the median 464 is bordered by border segments of solid lines associated with a "drivable lane border" driving rule and a "line" type border while the right-most part of the median 464 is bordered by border segments of dotted, hashed lines associated with an "impassable" driving rule and a "curb" type border. If necessary, the vehicle 200 could navigate across only the left-most part of the median 464.

FIG. 4 shows additional features added to the map format in order to improve the map format for use with the autonomous vehicle 200 of FIG. 2. First, three of the lane segments 412, 414, 416 are associated with stop lines 454, 456 near the traffic intersection (the traffic intersection being located on the right-most side of FIG. 4). The stop lines 454, 456 can be linked to the end of one or more lanes 402, 404, 406 and information associated with the stop lines 454, 456 can include a geographical location of a position where the vehicle 200 must stop before the traffic intersection. In the example of FIG. 4, the stop line 456 extends between the border segments 442, 448, denoting the geographical location at which the autonomous vehicle 200 should be positioned if stopping in front of the traffic intersection within either of the lanes 402, 404.

The additional information provided by the stop lines 454, 456 is useful in operation of the autonomous vehicle 200 because the stop lines 454, 456 allow the autonomous vehicle 200 to be positioned at the traffic intersection in a manner consistent with manual operation of a vehicle. For example, if the autonomous vehicle 200 approaches the traffic intersection within lane 402, instead of stopping at the waypoint 424 denoting the end of the lane segment 412, the autonomous vehicle 200 can be controlled to move forward to the stop line 456 and slightly around the corner of the lane 402 as denoted by the border segment 442. This maneuver is more consistent with how a driver would manually operate a vehicle on the road 400 when making a right turn at a traffic intersection. Though not shown, crosswalks can also be included in the detailed map format in a manner similar to that used for the stop lines 454, 456. Information associated with the crosswalks can include a geographical location of a position of the crosswalk and a driving rule associated with the crosswalk that directs the automated vehicle system to implement additional safety protocols.

Traffic signals are another feature present within the map format shown in FIG. 4. Each traffic signal can include information such as geographical location, traffic signal type, and traffic signal state. Traffic signal type can include information on the structure and orientation of a traffic light or traffic sign. Traffic signal structure and orientation for a traffic light can include "vertical three," "vertical three left arrow," "horizontal three," "right arrow," etc. Traffic signal state for a traffic light can include, for example, "green," "green arrow," "yellow," "blinking yellow," or "red." In the map format shown in FIG. 4, three traffic lights 458, 460, 462 are shown within the traffic intersection. In this example, traffic light 458 is associated with lane 402, and given the structure of the intersection and the shape and type of the border segments proximate lane 402, lane 402 is understood to be a right turn lane. Similarly, traffic light 462 is associated with lane 406, and given the structure of the intersection and shape and type of the border segments proximate lane 406, lane 406 is understood to be a left turn lane.

Figure 5:
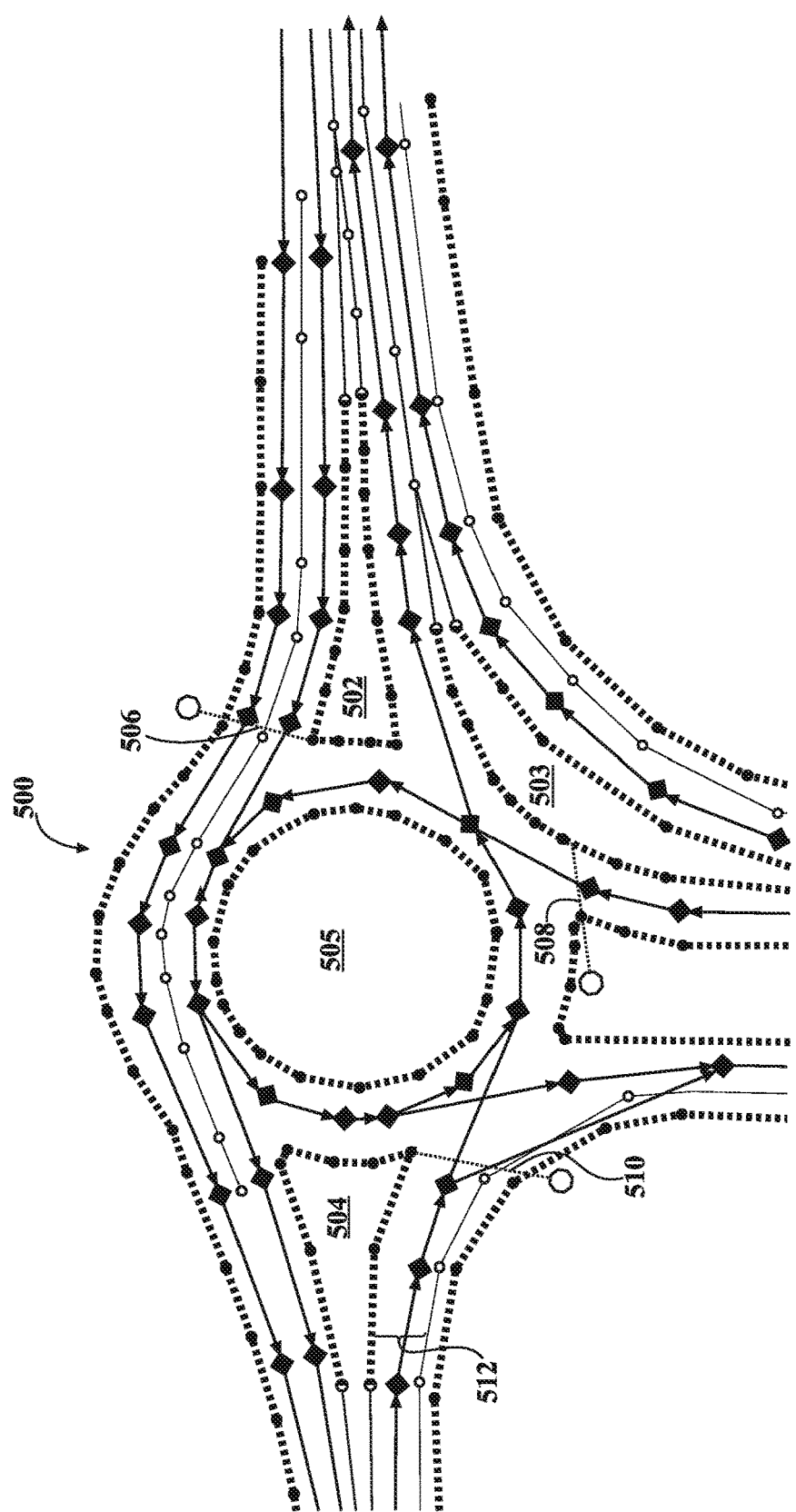
FIG. 5 shows an example two-dimensional representation of a roundabout as represented within a detailed map format for use with the autonomous vehicle of FIG. 2.

FIG. 5 shows an example two-dimensional representation of a roundabout 500 as represented within a detailed map format for use with the autonomous vehicle 200 of FIG. 2. Maneuvering the autonomous vehicle 200 through the roundabout is greatly aided by the use of lane segments, border segments, and stop lines. For example, medians 502, 503, 504 and center circle 505 can be identified using borderpoints and border segments and be associated with driving rules as "impassable" areas of the roundabout 500. In another example, stop lines 506, 508, 510 can be used to indicate to the autonomous vehicle 200 the exact location where the autonomous vehicle 200 should stop before entering the roundabout 500. As shown in FIG. 5, stop line 510 indicates a position to the right and below the nearest waypoint within lane 512. Using the stop line 510 to position the autonomous vehicle 200 at the entrance to the roundabout 500 is much closer to how a driver would operate a vehicle when compared to stopping the autonomous vehicle 200 at the final waypoint within the lane 512.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is to be accorded the broadest interpretation so as to encompass all such modifications and equivalent structures as is permitted under the law.

What is claimed is:

1. A method of operating an autonomous vehicle, the method comprising:
    determining a current location of the autonomous vehicle;
    comparing the current location of the autonomous vehicle to a computer readable map format, the map format including a lane segment and a border segment, the border segment being formed from a plurality of borderpoints, wherein information is associated with one or more of the plurality of borderpoints, the information including a geographical location, a border type, and a border color;
    determining, using the map format, a distance between the current location of the autonomous vehicle and an edge of the lane segment at a location along the lane segment, the determining including measuring a distance between the current location of the autonomous vehicle and a portion of the border segment closest to the current location of the autonomous vehicle;
    determining a driving maneuver based on the determined distance, the driving maneuver being a driving maneuver affecting the movement of the autonomous vehicle; and
    causing one or more vehicle systems of the autonomous vehicle to implement the determined driving maneuver, whereby movement of the autonomous vehicle is affected by the implemented driving maneuver.

2. The method of claim 1, wherein the lane segment is formed from a plurality of waypoints, and wherein information associated with each waypoint includes at least one of a geographical location and a lane speed and a lane direction.

3. The method of claim 1, wherein information associated with the lane segment includes a driving rule, and wherein the driving rule is based at least in part on the border type and the border color associated with a proximate one of the plurality of borderpoints.

4. The method of claim 1, wherein the border type includes at least one of a curb, a single solid line, a double solid line, a single dashed line, a combined dashed line and solid line, and no line.

5. The method of claim 1, wherein the border color includes at least one of yellow, white, and unknown.

6. The method of claim 1, wherein the map format further includes a stop line associated with an end of the lane segment, wherein information associated with the stop line includes a geographical location, the geographical location representing a position where a vehicle must stop before a traffic intersection.

7. The method of claim 1, wherein the map format further includes a traffic signal, wherein information associated with the traffic signal includes a geographical location and a traffic signal type and a traffic signal state.

8. The method of claim 7, wherein the traffic signal type includes information regarding structure and orientation for at least one of a traffic light and a traffic sign.

9. The method of claim 8, wherein the traffic signal type is a traffic light and the traffic signal state includes at least one of green, green arrow, yellow, blinking yellow, and red.

10. An autonomous vehicle system comprising:
a processing unit;
a memory communicatively coupled to the processing unit, the memory including a computer-readable map format, the map format including a lane segment and a border segment, the border segment being formed from a plurality of borderpoints, wherein information is associated with one or more of the plurality of borderpoints, the information including a geographical location, a border type, and a border color; and
one or more vehicle communicatively coupled to the processing unit,
the processing unit being configured to:
compare a current location of an autonomous vehicle to the map format;
determine, using the map format, a distance between the current location of the autonomous vehicle and an edge of the lane segment at a location along the lane segment, the determining including measuring a distance between the current location of the autonomous vehicle and a portion of the border segment closest to the current location of the autonomous vehicle;
determine a driving maneuver based on the determined distance, the driving maneuver being a driving maneuver affecting the movement of the autonomous vehicle; and
cause one or more vehicle systems to implement the determined driving maneuver, whereby movement of the autonomous vehicle is affected by the implemented driving maneuver.

11. The system of claim 10, wherein the lane segment is formed from a plurality of waypoints, and wherein information associated with each waypoint includes at least one of a geographical location and a lane speed and a lane direction.

12. The system of claim 10, wherein information associated with the lane segment includes a driving rule, and wherein the driving rule is based at least in part on the border type and the border color associated with a proximate one of the plurality of borderpoints.

13. The system of claim 10, wherein the border type includes at least one of a curb, a single solid line, a double solid line, a single dashed line, a combined dashed line and solid line, and no line.

14. The system of claim 10, wherein the border color includes at least one of yellow, white, and unknown.

15. The system of claim 10, wherein the map format further includes a stop line associated with an end of the lane segment, wherein information associated with the stop line includes a geographical location, the geographical location representing a position where a vehicle must stop before a traffic intersection.

16. The system of claim 10, wherein the map format further includes a traffic signal, wherein information associated with the traffic signal includes a geographical location and a traffic signal type and a traffic signal state.

17. The system of claim 16, wherein the traffic signal type includes information regarding structure and orientation for at least one of a traffic light and a traffic sign.

18. The system of claim 17, wherein the traffic signal type is a traffic light and the traffic signal state includes at least one of green, green arrow, yellow, blinking yellow, and red.

* * * * *